United States Patent [19]

Aleniusson

[11] 4,054,985
[45] Oct. 25, 1977

[54] METHOD FOR THE APPLICATION OF A PROTECTION COVER AROUND HEAT OR COOL INSULATED TUBE BENDS

[75] Inventor: Sven Göran Aleniusson, Valberg, Sweden

[73] Assignee: Isolerings Aktiebolaget Isenta, Orebor, Sweden

[21] Appl. No.: 692,377

[22] Filed: June 3, 1976

[30] Foreign Application Priority Data

June 30, 1975 Sweden .............................. 7507466

[51] Int. Cl.² .......................................... B23P 17/00
[52] U.S. Cl. ................................. 29/416; 29/157 A; 113/116 UT; 138/151; 285/47; 285/183
[58] Field of Search ............ 29/416, 157 A; 285/179, 285/47, 183, 419; 113/116 UT; 138/178, 169, 149, 150, 151, 156, 157, 158, 159, DIG. 11

[56] References Cited

U.S. PATENT DOCUMENTS

| 394,479 | 12/1888 | Evans et al. ........................ 285/183 |
| 1,049,543 | 1/1913 | Smith .............................. 138/159 X |
| 2,923,650 | 2/1960 | Seme ............................... 138/151 X |
| 3,153,546 | 10/1964 | Dunn ............................... 285/183 X |
| 3,559,694 | 2/1971 | Volberg ............................ 285/47 X |
| 3,620,258 | 11/1971 | Graham ............................. 138/178 |
| 3,732,894 | 5/1973 | Botsolas .......................... 285/183 X |

FOREIGN PATENT DOCUMENTS

| 456,258 | 5/1949 | Canada ............................. 29/157 A |

*Primary Examiner*—Victor A. DiPalma
*Attorney, Agent, or Firm*—Larson, Taylor and Hinds

[57] ABSTRACT

A protective cover for an insulated pipe bend. A corrugated band-form material is spirally wound into a tube and the adjoining tube edges are secured, such as by lapping, to form a non-slipping joint. The corrugated tube thus provided can be readily shaped to conform to an existing tube bend. The corrugated tube is cut lengthwise into two or more parts which are then placed over the insulated pipe bend. The cut edges are re-joined to form the protective cover.

13 Claims, 5 Drawing Figures

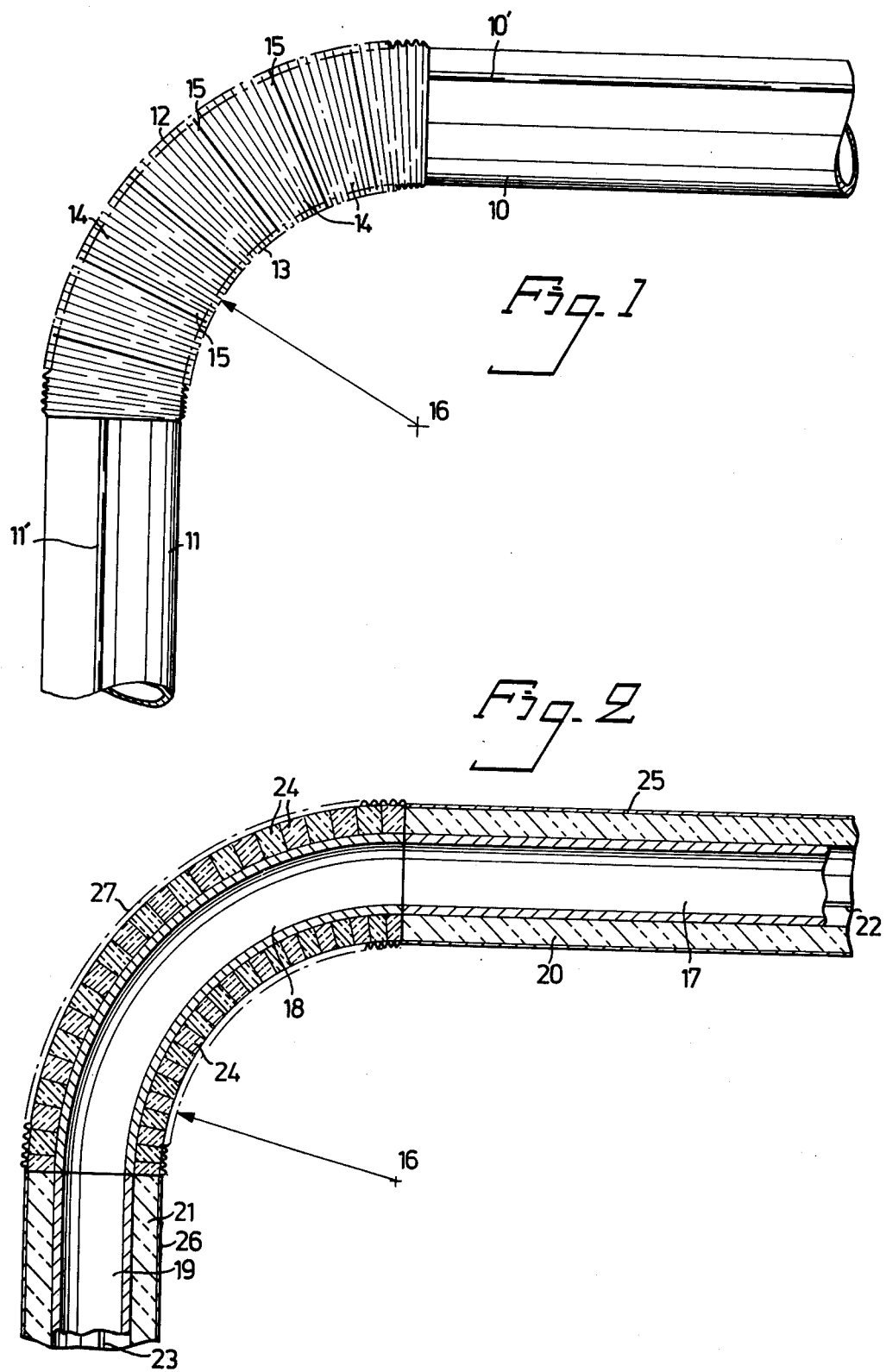

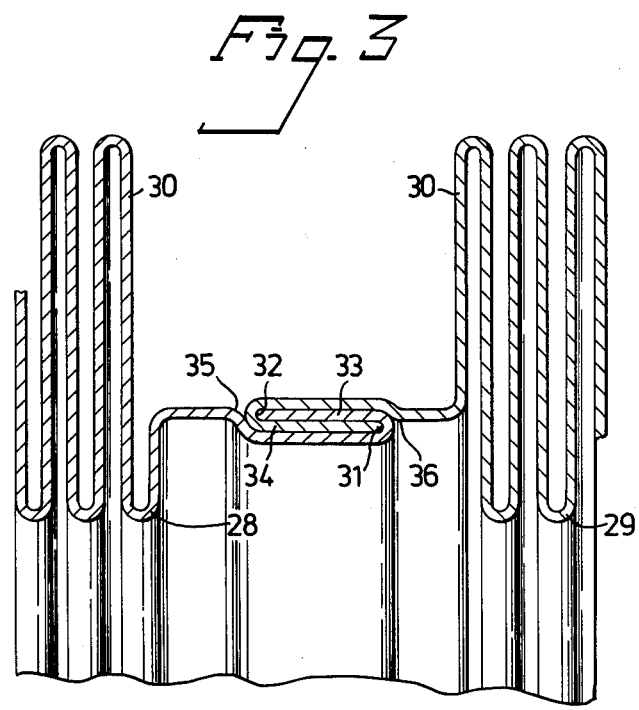
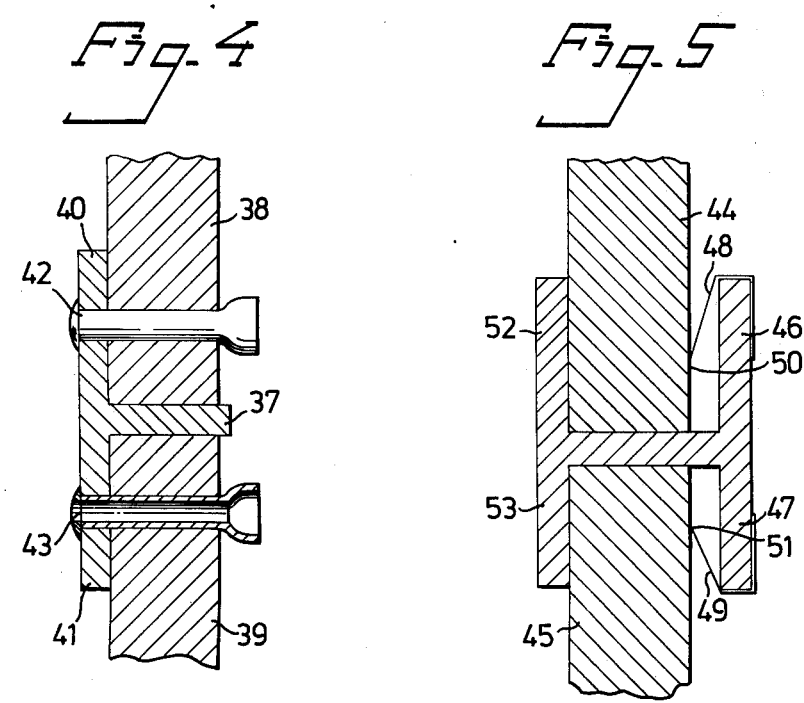

METHOD FOR THE APPLICATION OF A PROTECTION COVER AROUND HEAT OR COOL INSULATED TUBE BENDS

It is common practice to heat insulate or cool insulate, resp., tubings through which mediums are conducted with a temperature essentially different from ambient. As insulation material around the tubing, layers of some effective heat insulating material are used, for instance mineral wool, expanded plastic or the like. Rather often ready made bodies, so called pipe shells, are produced from the said insulating material, so that they can be applied directly around the tubing. Some difficulty has existed in the insulation of tube bends, because traditional pipe shells cannot be used. However, there are a lot of different ways to avoid these difficulties.

All of the insulation materials concerned, however, are of such a character that they are easily damaged by unintentional contact with hard subjects. As the conduits of the kind here concerned are often applied in rather narrow aisles, through which one has also to transport various objects, there is a risk of damaging the insulation. For that reason it has been proposed to surround the insulation layer around the insulated conduits with covers of tube form, made, for instance, from aluminum or other metallic sheet, plastic or the like, and such protection covers have proved to function well. Thereby, however, one has again met with difficulties in protecting the insulation of tube bends. The number of tube diameters and, as a consequence thereof, the number of outside diameters for the insulation, to which the protection covers have to be adapted, is exceedingly large. In addition, each separate tube diameter with the outer diameter of the insulation pertaining thereto, usually a great number of different curvatures of radius exist for the tube bends. Finally, the tube bends are often arranged with a bending angle than a right angle. All of these factors result in the fact that it is in practice neither economically feasible or practical to make insulation protection covers in preshaped parts.

The present invention relates to a method for the application of protection covers about heat insulated or cool insulated tube bends, by which the above mentioned disadvantages are avoided.

According to the invention, one uses for the production of the protection cover a tube formed channel of spirally wound, band shaped material, preferably of circular cross section area. The tube shaped, spirally wound channel is one which is firstly lapped by means of a self binding lap, secondly is corrugated with one or more corrugation waves within each turn located between each pair of such self-binding laps, said corrugation waves running in the longitudinal direction of the band forming the channel. This channel is subjected to two different operations in deliberate order of sequence, viz. firstly shaping according to the outer circumference of the insulation around the tube bend and secondly also cutting up by means of one or more cuts, preferably by means of one single diametrical cut, so that two half parts are formed of the protection cover, which may thereafter be applied around the tube bend, the insulation of which is thus protected. Finally, the parts provided by the cutting up are joined along the cutting lines.

The invention will below be further explained in connection with a preferred embodiment, shown in the attached drawing, but it is understood that the invention shall not be limited to this specific embodiment, but that all different kinds of modifications may occur within the frame work of the invention.

In the drawing,

FIG. 1 shows a tube bend along with the straight tube parts attached thereto, all of which being insulated. The tube bend is provided with a protection cover according to the invention.

FIG. 2 shows a section through the arrangement according to FIG. 1.

FIG. 3, in enlarged scale, shows a section through the lap of a spirally wound channel according to the invention, and FIGS. 4 and 5 show two different shapes of sections of the boarders, which may be used for reconnection of the edges of a cut up, spirally wound channel after its application as a protection cover around a tube bend in accordance with the invention.

In FIG. 1 two straight, insulated tube parts 10 and 11 are shown, surrounded with a protection sleeve. Suitably, they are insulated by traditional insulating pipe shells, and thereafter surrounded by a protection sleeve, for instance of metallic material, which is joined along the joining line 10' or 11', resp. The two tube parts are assumed, in this case to be situated in right angle to each other, and for that reason they are connected by a tube bend 18, see FIG. 2, having 90° angle, which also is insulated in some way, known per se. For the protection of the insulation of the tube bend 18, a protection jacket according to the present invention has been provided which comprises two half parts of a spirally wound channel, cut up along the lines 12, 13 and again joined together, said channel initially having a straight run and circular cross section area, which has, however been bent in such a way that it is adapted to the existing bend of tube 18. Spirally wound tubes usually comprise a spirally wound band, which at its one edge is attached, by means of lapping, to the edge of the turn, and with its other edge is attached to the edge immediately preceding of the immediately following turn.

There are, two different general types of spirally wound channels or, as they are usually called, "spiral tubes". In one type, upon binding, an expansion will take place which will take place in the lap proper. Examples of this type are so called washing room hoses or shower hoses. In these tubes, the spirally wound bands are as a rule not corrugated in their longitudinal direction. This type of spiral tube cannot be used for the purpose of the present invention, because the lap must have the required sliding space for the bending, and is therefore not self-binding. In the other second type, however, the lap is self-binding, which means that it is locked against displacement in the longitudinal direction of the tube and is rather firmly pressed, for this purpose. For making possible that the spiral tube shall nevertheless easily be bent, the spirally wound band or bands, from which the spiral tube is produced, are corrugated in their longitudinal direction. If the spiral tube according to the invention has been produced by two or more such bands in a multiple arrangement, it is not necessary that all of them be corrugated in this way. It is sufficient that, for instance in a tube having two bands in multiple winding, one is corrugated. It is this second type of spiral tube which is used according to the present invention.

Each such band contained in a spiral tube usually comprises a number of corrugation waves running in its longitudinal direction. In FIG. 1 the protection cover has been shown as if it only comprised seven turns 14, separated by means of lap parts 15, but this illustration has only been made for gaining increased clearness. In practice, the number of turns in a usual tube bend will be greater. The number of corrugation waves within each band 14 may also vary. As a rule, such a spirally wound tube is better bendable and thereby also better adaptable to the tube bend, the greater the number of the turns of the band is, and the narrower the bands are, and the greater the number of the corrugation waves is, and the deeper these corrugation waves are. In principle, a tube should in many a case be possible to be used, even if the band would only contain one single corrugation wave in each turn. However, in practice it is suitable that one provides a plurality of corrugation waves, for instance not less than five and not more than 10 such corrugation waves. The height of each corrugation wave thereby should be greater than the separation between corrugation waves, preferably about two or three times the separation.

The cover according to FIG. 1 has been produced in the way that a piece of a straight tube of spirally wound type has been cut to a length about corresponding to the outer circumference of the tube bend along the line 12. Thereafter, this spirally wound tube has been shaped for application outside of the insulation around the tube bend, either during the time that the spiral tube was still in its straight state, after which it has been cut up into two halves, and each of the two half parts have been shaped according to the tube bend, or the spiral tube has first been shaped in agreement with the tube bend, and thereafter been cut up. In both cases, the result will be two half parts, which may be applied over the tube bend and against each other and may be fixed along their joining edges.

By corrugating the spiral tube wall it is very easy to form the spiral tube, and this, as a rule, may be done by hand without effort for instance in situ. Of course nothing prevents the forming from taking place in a factory, since most materials from which spirally wound tubes are made, retain their wound shape.

In the arrangement according to FIG. 1, the tube has first been bent into the right shape and thereafter it has been cut up. In this case it is most simple to cut the tube up along a diametrical level through the bending centre 16 of the tube bend, because the cut will thereby be plane.

The hot or cold medium, which should be insulated against exchange of heat to the surrounding, is conducted through the tube 17, the tube bend 18 and the tube 19, see FIG. 2.

For simplification of the description, the tube joints between the two straight tubes 17 and 19, on the one side, and the tube bend 18, on the other side, have not been shown in FIG. 2. These tube joints, of course, are of the traditional type.

The tubes 17 and 19 may be surrounded by pipe shells 20 and 21, resp., also of the traditional type, for instance cut along generatrix lines 22 and 23, respectively, for making possible their opening and application about the tubes concerned, or with any other suitable insulation. The tube bend is also insulated in some way, preferably one way, which is known per se, for instance by conically cut sectors 24 of mineral wood, applied thereon. Outside of the insulation 20, 21 of the straight parts, there is, in a way known per se, applied sheet-formed protection sleeves 25, 26, arranged and joined along the edges 10', 11'. Outside of the insulation 24 around the tube bend 18, two half parts of a spirally wound tube according to the invention are arranged. As the tube has been assumed to have been cut along a diametrical plane through the center of curvature 16, and have been reproduced in FIG. 2 in section, one will only see the back one 27 of the two half parts.

The spirally wound tube should be self-binding. This means that when the tube is cut up along a deliberate diametrical level, the spiral turns shall not of their own proper spring action be separated from each other, but they shall, by the type of lap, still be kept together. How such a lap may be formed is for instance to be seen in FIG. 3.

Although the two turns, which have been lapped together according to FIG. 3, form parts of one and the same band, they have been joined in mutually different directions for simplification of the explanation. If the spirally wound tube should have been produced in multiple winding from two tubes having twice the rise as compared with the one band tube according to FIG. 2, then, of course, the two parts shown in the drawing should belong the one from the one band and the other one from the other band.

Of course, there are many different types of self-binding spirally wound tubes, and the one shown in FIG. 3 therefore only must be regarded as a chosen example. One turn thus is indicated by 28 and the other one by 29. Both of them are provided with corrugation waves 30. The lap contains on each side a so called lap pocket, viz. regarding the turn 28 the one, shown at 31, and regarding the turn 29 the one, shown at 32. The edge 33 turned backward on the turn 28 is pushed into the lap pocket 32, and the edge 34 on the turn 29, also folded back, is pushed into the lap pocket 31, whereafter the laps are pressed together. Both turns are lapped over a little at 35 and 36, resp., so that they will prevent side displacement in such a direction that the folded over edges 33, 34 would creep out from their lap pockets 31 and 32, resp. Of course, one cannot, theoretically, avoid a given sliding to take place in the lap in a direction perpendicularily to the level of the paper in FIG. 3. However, in practice, such sliding is effectively prevented by the beard which when using traditional cutting means are not avoided along the line of grades or cutting of the spirally wound tube. These grades or "beards" therefore are useful in the present case. One can also provide the cutting by means of a laser beam, and thereby a heat deformation corresponding to the said beard will be created, usually in the form of a welding together of the edges existing in the lap.

Joining together the two half parts of the bent over spirally wound tube may take place in a plurality of different ways. One very effective joining is obtained by the arrangement of a border strip in the joint. Two chosen examples for such border strips are shown in FIGS. 4 and 5.

In the arrangement according to FIG. 4, the border strip 38 has the shape in section of a T. The leg of the T is arranged between the two edges, turned against each other, of the spiral tube half part 38 and 39, resp., whereas the T-line with one end 40 is in connection with the one spiral tube half part 38 and with its other end 41 in connection with the other spiral tube half part 39. Through each of the line parts 40 and 41 of the T and the edges belonging to the spiral tube half parts, in this case, a number of holes are arranged, in which for instance expansion rivets or plug rivets 42 43 are placed.

One can also use other connection means, for instance self-threading sheet metal screws or the like.

In the arrangement according to FIG. 5, the strip is shaped like an H, and in each of the cavities of the strip, one edge of each of the two spiral tube half parts 44 and 45, turned against each other, is pushed in. From one and/or the other one of the two legs forming each cavity of the "H" section, for instance legs 46 and 47, inclined springs 48, 49 run, said springs being turned over around its respective leg. Each spring is attached to its exterior side and provided with sharp edges 50, 51 turned inwardly, which will mesh with the spiral tube half parts and lock them, after they have been pushed into the correct place. The required counter pressure is provided by the two remaining legs 52, 53.

The method described offers very great advantages. Thus it is not necessary to keep in store a great number of protection covers in ready made dimensions, suitable for all different needs, but one has only a need of greater length of the spirally wound tube of the above indicated character being available, from which adapted pieces can be cut off. The tubes must be corrugated within at least one of the spiral bands forming the tube, and the spiral bands must be joined by a self-binding lap. From these tubes one will thus have to cut off adapted pieces, and either before or after shaping them into agreement with the insulated tube bend to be protected against affects of the insulation, the tube piece is cut up by means of a cut in diametrical plane. Of course, it may happen that one will instead divide up the piece of tube in three or more parts, but, within the framework of the present invention, this has to be regarded as an equivalent to the cutting into two halves along a diametrical plane. After the pieces thus produced and shaped have been placed over the tube bend, they are united at their edges, turned against each other, and the protection cover is ready. This can take place in situ.

In many cases it is possible to arrange only one single cut through the wall of the tube, so that the tube will be divided up into two parts or perhaps in several parts, which are definitely separated from each other. On the other hand, the cut may run only through one single wall of the tube, so that the opposite wall will remain untouched, but the tube will nevertheless be possible to bend along a line, corresponding to this non-cut place, where it can be bent like on hinges. The tube thereby will open itself, and it can thereafter be applied over the tube bend, again closed and the edges may be united to each other. Also in this case, however, two or more parts of the tube exist, in effect, although they are not separated from each other.

It is a well known desire that spirally wound tubes of the type concerned shall not have any observable or strongly felt elastic return force for regaining their initial shape. A suitable material therefore is weak rolled aluminum, or some corresponding aluminum alloy, but also other materials such as galvanized sheet steel may be used, and also certain plastics without "shape memory". If a joining strip of the type shown in FIG. 5 is used, then the springs 48, 49 must be of such a type that they "enter" into the weaker mass of the spirally wound tubes. In this event, in practice, the spring must be steel.

On the other hand, the strip in its remaining parts may be made from the same material as the spirally wound tube, e.g. from aluminum, aluminium alloy, weak steel sheet, plastic or the like.

I claim:

1. A method of applying a protective covering around insulated pipe bends comprising the steps of:

providing a protective tube made from a spirally wound, band-form material, each turn of the spirally wound, band-form material being secured to an adjacent turn by a self-binding lap and being corrugated by at least one corrugation wave running in the longitudinal direction of the band-form material forming said turn;

cutting said protective tube along its length to form at least two parts;

shaping said protective tube to conform to the shape of an insulated pipe bend;

positioning said two parts of said protective tube around said insulated tube bend with the cut edges thereof in adjacency; and joining together said cut edges to form a protective covering around said insulated pipe bend.

2. A method according to claim 1 wherein said band form material is corrugated by from 5 to 10 corrugation waves running in the longitudinal direction of said band form material.

3. A method according to claim 2 wherein the height of said corrugation waves exceeds the separation between adjacent corrugation waves.

4. A method according to claim 1 wherein said protective tube is cut in a plane corresponding to a diametrical plane for the tube bend and having the center of curvature of the tube band as its center.

5. A method according to claim 1 wherein said cut edges of said protective tube are joined by a strip member running along said edges.

6. A method according to claim 5 wherein said strip member is T-shaped in section with the leg of the T positioned between adjacent cut edges.

7. A method according to claim 5 wherein said strip member is secured to said edges by fastening means extending through said strip member and through said protective tube.

8. A method according to claim 5 wherein said strip member is H-shaped in section and wherein the adjacent cut edges are positioned, respectively, in the cavities formed between the legs of said H.

9. A method according to claim 8 further comprising spring means for securing a cut edge of said protective tubing within each of said cavities.

10. A method according to claim 1 wherein said band form material is selected from the group consisting of aluminum, aluminum alloys, sheet steel, and plastic.

11. A method according to claim 10 wherein said band form material comprises a shapable plastic without observable elasticity or shape memory.

12. A method according to claim 1 wherein the protective tube is cut prior to shaping.

13. A method according to claim 1 wherein the protective tube is cut subsequent to shaping.

* * * * *